US007624126B2

(12) United States Patent
Pizzo et al.

(10) Patent No.: US 7,624,126 B2
(45) Date of Patent: Nov. 24, 2009

(54) REGISTERING FOR AND RETRIEVING DATABASE TABLE CHANGE INFORMATION THAT CAN BE USED TO INVALIDATE CACHE ENTRIES

(75) Inventors: Michael Joseph Pizzo, Bellevue, WA (US); Robert Michael Howard, Frisco, TX (US); Patrick Yu-Kwan Ng, Redmond, WA (US); Scott D. Guthrie, Bellevue, WA (US); Adam Wade Smith, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 501 days.

(21) Appl. No.: 10/603,532

(22) Filed: Jun. 25, 2003

(65) Prior Publication Data

US 2004/0267824 A1    Dec. 30, 2004

(51) Int. Cl.
*G06F 12/00* (2006.01)
*G06F 17/30* (2006.01)

(52) U.S. Cl. .............................. 707/200; 707/2; 707/4; 707/201; 707/203; 707/205; 711/141; 711/144

(58) Field of Classification Search ........................ None
See application file for complete search history.

(56) References Cited

U.S. PATENT DOCUMENTS

| | | | |
|---|---|---|---|
| 5,897,634 A | 4/1999 | Attaluri et al. ................. 707/8 |
| 6,026,413 A * | 2/2000 | Challenger et al. ........... 707/202 |
| 6,185,608 B1 * | 2/2001 | Hon et al. .................... 709/216 |
| 6,216,212 B1 * | 4/2001 | Challenger et al. ........... 711/163 |
| 6,466,949 B2 * | 10/2002 | Yang et al. ................... 707/201 |

(Continued)

FOREIGN PATENT DOCUMENTS

EP    0 959 416    11/1999

(Continued)

OTHER PUBLICATIONS

Challenger, Jim, et al. "A Scalable System for Consistently Caching Dynamic Web Data" Infocom '99. Eighteenth Annual Joint Conference of the IEEE Computer and Communications Societies. Proceedings. WEE New York NY Mar. 21-25, 1999; Piscataway, NJ, YEE, Mar. 21, 999; pp. 294-303.*

(Continued)

*Primary Examiner*—Hosain T Alam
*Assistant Examiner*—Usmaan Saeed
(74) *Attorney, Agent, or Firm*—Workman Nydegger

(57) ABSTRACT

A server provides Web responses that can include content from data tables in a database. The server maintains a cache (e.g., in system memory) that can store content (including content from data tables) so as to increase the efficiency of subsequently providing the same content to satisfy client Web requests. The server monitors data tables for changes and, when a change in a particular data table occurs, invalidates cached entries that depend on a particular data table. Further, in response to a client Web request for a Web response, the server assigns a database cache dependency to at least a portion of a constructed Web response (e.g., to content retrieved from a data table) based on commands executed during construction of the Web response. The at least a portion of the constructed Web response is subsequently cached in a cache location at the server.

23 Claims, 4 Drawing Sheets

U.S. PATENT DOCUMENTS

| | | | |
|---|---|---|---|
| 6,487,641 B1 * | 11/2002 | Cusson et al. | 711/144 |
| 6,493,720 B1 * | 12/2002 | Chu et al. | 707/104.1 |
| 6,502,093 B1 | 12/2002 | Bhatt et al. | 707/3 |
| 6,516,327 B1 * | 2/2003 | Zondervan et al. | 707/200 |
| 6,591,266 B1 * | 7/2003 | Li et al. | 707/10 |
| 6,732,237 B1 * | 5/2004 | Jacobs et al. | 711/119 |
| 6,757,708 B1 * | 6/2004 | Craig et al. | 709/203 |
| 6,871,268 B2 * | 3/2005 | Iyengar et al. | 711/146 |
| 6,970,981 B2 * | 11/2005 | Kanaley | 711/141 |
| 7,089,228 B2 * | 8/2006 | Arnold et al. | 707/205 |
| 7,136,885 B2 * | 11/2006 | Wright et al. | 707/205 |
| 7,139,973 B1 * | 11/2006 | Kirkwood et al. | 715/206 |
| 7,269,648 B1 * | 9/2007 | Krishnan et al. | 709/224 |
| 7,318,074 B2 * | 1/2008 | Iyengar et al. | 707/203 |
| 2002/0116582 A1 * | 8/2002 | Copeland et al. | 711/133 |
| 2003/0093413 A1 * | 5/2003 | Dettinger et al. | 707/3 |
| 2003/0217081 A1 | 11/2003 | White et al. | 707/203 |
| 2004/0133538 A1 * | 7/2004 | Amiri et al. | 707/1 |
| 2004/0267712 A1 * | 12/2004 | Papanyan et al. | 707/3 |
| 2006/0022048 A1 * | 2/2006 | Johnson | 235/462.1 |

FOREIGN PATENT DOCUMENTS

| | | |
|---|---|---|
| EP | 1492027 A1 * | 12/2004 |

OTHER PUBLICATIONS

Shaul Dar, Michael J. Franklin, Björn T. Jónsson, Divesh Srivastava, Michael Tan "Semantic Data Caching and Replacement", Proceedings of the 22th International Conference on Very Large Data Bases, published 1996.*

Brian Babcock et al. Models and Issues in Data Stream Systems. ACM Pods Jun. 3-6, 2002.*

Challenger, Jim, et al. "A Scalable System for Consistently Caching Dynamic Web Data" Infocom '99. Eighteenth Annual Joint Conference of the IEEE Computer and Communications Societies. Proceedings. IEEE New York NY Mar. 21-25, 1999; Piscataway, NJ, IEEE, Mar. 21, 999; pp. 294-303.

"Dynamic Caching: Dynamic Pages Delivered Faster" Nov. 2000, Spidercache, Inc. Vancouver, Canada.

Mohan, C. "Caching Technologies for Web Applications" Proceedings of the International Conference on Very Large Data Bases, Sep. 12, 2001, pp. 1-31.

"Where XCache Fits In" SCache Technologies, Nov. 29, 2001; Retrieved from the Internet: URL:http://www/archive.org/web.20010609055857 www.xchche.com/home/printer_xcache_where_xcache_fits_in.htm.

* cited by examiner

REGISTERING FOR AND RETRIEVING DATABASE TABLE CHANGE INFORMATION THAT CAN BE USED TO INVALIDATE CACHE ENTRIES

BACKGROUND OF THE INVENTION

1. The Field of the Invention

The present invention relates to managing cached content. More specifically, the present invention relates to registering for and receiving database table change notifications that can be used to invalidate cache entries.

2. Background and Related Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another to form both wired and wireless computer networks over which the computer systems can communicate electronically to share data. As a result, many tasks performed at a computer system (e.g., voice communication, accessing electronic mail, electronic conferencing, web browsing) include electronic communication with one or more other computer systems via wired and/or wireless computer networks.

In particular, the World Wide Web ("WWW") has become an important mechanism for exchanging information. Generally, content on the WWW is accessed in a client/server model. A "Web browser" at a client computer system sends a request to access content that is maintained by a "Web Server" at a server computer system. When appropriate, the Web server subsequently provides the requested content to the Web browser.

One way of making content available to Web browsers is for a Web developer to create a static Web page that includes a number of hard-coded computer-readable instructions, such as, for example, in HyperText Markup Language ("HTML"). The static Web page is then stored in a location (e.g., at the server computer system, in a network connectable database, etc.) that is accessible to the Web server. In response to a request from the Web browser, the Web server can transfer the static Web page to the Web browser (e.g., as a result of user input causing the Web browser to access a Uniform Resource Locator ("URL") that corresponds to the static Web page). Upon reception of the static Web page, the Web browser can present the content of the static Web page (e.g., text, graphics, etc.) at the client computer system.

To conserve network resources, the Web browser may also cache a copy of the static Web page at the client computer system (e.g., in system memory or at a mass storage device). When the static Web page is subsequently requested, the Web browser attempts to locate the static Web page from cache before initiating a new network request to the Web server. If the static Web page is located in cache, the Web browser retrieves the cached static Web page instead of initiating a network request. Since locally stored data can be accessed more efficiently, caching static Web pages at the client computer system reduces the latency associated with presenting the content of the static Web page.

Frequently requested static Web pages can also be cached at a server computer system (commonly referred to as output caching) to reduce latency. For example, a frequently requested static Web page can be cached in system memory at the server computer system so the static Web page does not have to be retrieved from a mass storage device each time the static Web page is requested. Because of their static nature, static Web pages can be cached (at a client or server computer system) for long periods of time, potentially indefinitely.

However, the use of static Web pages essentially prevents real-time or custom data from being presented by a Web browser. Often, it is desirable to present dynamic data (e.g., daily sales figures, current stock prices, etc.) at a Web browser. Accordingly, mechanisms for including dynamic data in dynamic Web pages that are to be presented at a Web browser have been developed. One mechanism for including dynamic data in dynamic Web pages is the use of modular pieces of computer-executable instructions (commonly referred to as "scripts").

Scripts can be developed using scripting languages, such as, for example, JavaScript and VBScript, and embedded along with HTML and Extensible Markup language ("XML") instructions in a page file (e.g., an Active Server Pages ("ASP") file). When a request for a dynamic Web page is received, the server computer system redirects the request to a processing module (e.g., an ASP module) that processes a corresponding page file. The processing module executes any scripts included in the page file, and generates appropriate HTML instructions to return in response to the request. Scripts can include computer-executable instructions for accessing data from dynamic locations, such as, for example, from a database that maintains current sales figures or stock quotes. Since scripts are executed essentially at the time a request is received, scripts can be utilized to generate dynamic Web pages that include real-time data.

Similar to static Web pages, a dynamic Web page can be cached to provide more efficient access to the dynamic Web page. However, dynamic content (e.g., a price quote) included in a dynamic Web page is typically valid for a limited time (e.g., until values at the location where the dynamic content was retrieved change). Often, dynamic content (e.g., a stock quote) will be valid for a very short period time, for example, only a few seconds. When the value of dynamic content changes, cached dynamic content can become invalid. For example, when a stock price changes from $20.00 to $21.00, a cached value of $20.00 is not valid (or even correct). When invalid dynamic content remains in cache, there is some potential for a Web server to provide incorrect dynamic content to a Web browser. For example, when an invalid stock price remains in cache, a Web server might retrieve the invalid stock price from cache instead of re-executing a script to retrieve an updated stock price from a database. Accordingly, cache management mechanisms that attempt to insure the validity of cached dynamic content have been developed.

Some cache management mechanisms automatically remove dynamic content from cache at specified time intervals, such as, for example, every ten minutes. However, if a dynamic content value changes between specified time intervals there still exists a potential for an invalid dynamic content value to remain in cache. For example, if a specified time interval is five minutes and a dynamic content value is updated one minute after it is cached, the dynamic content value is invalidated but will remain cached at least for four minutes. During those four minutes, the Web serer may incorrectly retrieve the cached dynamic content value instead of running a script to retrieve the updated dynamic content value.

Further, removing content at specified time intervals may cause a value that is still valid to be removed from cache. For example, if a specified time interval is ten minutes and a dynamic content value remains valid ten minutes after it was cached, the dynamic content value is still removed from cache. Thus, the potential for more efficiently retrieving the dynamic content value in response to a subsequent request is prevented.

Other cache management mechanisms monitor files (e.g., XML files) stored at server computer system and invalidate cached dynamic content values from a monitored file when the monitored file changes. Yet other cache management mechanisms monitor cache entries and invalidate one cache entry when another cache entry is invalidated. Accordingly, some cache management mechanisms cause the validity of cache entries to be dependent on time, a corresponding file, or another corresponding cache entry.

However, existing cache management mechanisms (including those that use time, file, and cache dependencies) are not well suited for invalidating cached dynamic content values retrieved from locations that are external to the server computer system. For example, a Web browser may request a Web page that is to include dynamic content values from a number of different tables in a database. Accordingly, a page file with appropriate scripts can be processed at the server computer system to retrieve the dynamic content values and generate appropriate HTML instructions.

However, retrieving data from a database consumes both network and database resources. If calculations are to be performed on retrieved data, additional server computer system resources are also consumed. Further, it may be that a server computer system simultaneously queries a database for a number of different portions of dynamic content that will be included in different Web pages. It may also be that a number of server computer systems each access dynamic content from the same database.

Thus, a single database may simultaneously provide dynamic content to a number of server computer systems, where each server computer system simultaneously queries the database for different portions of dynamic content. As a result, the single database becomes a resource that is shared among the number of server computer systems and thus potentially limits scalability. That is, the addition of more server computer systems will not necessarily increase performance, since each server computer system is limited at least by the time needed for content to be retrieved from the single database. Further, when content is pre-maturely removed from cache (e.g., at a specified interval) a server computer system may be required to re-query the database, even if the dynamic content in the cache is still valid. In a multi-server environment, pre-mature removal of cached content can place an unnecessary burden on the resources of a shared database, thereby also, and possibly significantly, limiting scalability. Accordingly, what would be advantageous are mechanisms for configuring cache entries to be dependent on and invalidating cache entries based on changes in database tables.

BRIEF SUMMARY OF THE INVENTION

The foregoing problems with the prior state of the art are overcome by the principles of the present invention, which are directed towards systems, methods, computer program products, and data structures for registering and retrieving database table change information that can be used to invalidate cache entries. A client computer system with a browser is network connectable to server computer system that can generate and provide Web responses (e.g., Web pages and/or Web service results) to the client computer system. The server computer system accesses at least some of the content for Web responses from data tables in a database. The server computer system maintains a cache (e.g., in system memory) that can store provided content so as to increase the efficiency of subsequently providing the same content to satisfy client Web requests.

The server computer system selects a data table (e.g., in response to user input) contained in the database (e.g., a SQL database) that is to be monitored for data changes. A record that corresponds to the selected data table is inserted into a change notification table (also contained in the database). The corresponding record includes versioning information, such as, for example, a change ID, for the selected data table. A trigger, which causes versioning information for the selected data table to be updated in the change notification table when content in the selected data table is altered, is assigned to the selected data table.

In response to content alteration (e.g., inserting, deleting, or updating a record) in the selected data table, the corresponding versioning information in the change notification table is updated. From time to time or in response to a request to retrieve cached content, the server computer system queries the change notification table for versioning information corresponding to one or more tables in the database. A query can be configured to request versioning information for all monitored data tables represented in the change notification table, to request versioning information for monitored data tables with outstanding cache dependencies, or to request versioning information for monitored data tables that have changed (e.g., by including current versioning information in the query). In response to a query, updated versioning information is returned from the database to the server computer system. Based on the configuration of the query, the database can return, for example, versioning information for all monitored data tables, versioning information for monitored data tables with outstanding cache dependencies, or versioning information for monitored data tables that have changed.

Alternatively, the server computer system can issue a query to the change notification table and request that the issued query block on the server computer system until the versioning information for a requested table(s) is updated. For example, the server computer system can issue a query that blocks on the server computer system until current version information becomes greater than a specified threshold. The issued blocking query can be executed synchronously, such that a corresponding thread on the server computer system blocks until results are available. On the other hand, the issued blocking query can be executed asynchronously, such that a corresponding thread on the server computer system is not blocked and a callback is invoked on the server computer system (e.g., on a separate thread) when results are available.

The server computer system determines that cached content is dependent on one of the data tables (e.g., as a result of a previously assigned database cache dependency). The server computer system compares current versioning information (received in the list) to cached versioning information (e.g., versioning information cached along with a portion of cached content). This can include comparing a received change ID to a cached change ID. When appropriate, for example, when content in the data table changes after a portion of content based on the data table was cached, the portion of cached content is removed from cache. Accordingly, cached content that is dependent on a monitored data table can be appropriately invalidated and removed from cache. Appropriately invalidating and removing cached content reduces the likelihood of a server computer system including invalid cached content in a Web response. Further, the chances of removing valid data (e.g., that can occur with a time dependency) are also reduced thereby potentially increasing the efficiency of Web response generation.

In some embodiments, cached content is in the form of objects or results used to generate a Web response, such as tabular data, objects, collections, or partial responses. Caching these interim results is appropriate when the results can be used in the generation of more than one Web response, where each Web response contains additional differentiating information (e.g., customization or the inclusion of other relevant information). In other embodiments, an entire Web response is cached. Caching an entire Web response is appropriate when the Web entire response can be shared across multiple Web requests. When caching a complete Web response, the Web response may be pushed down to be cached in lower levels of the server computer system, for example, a kernel-mode response cache. Accordingly, when the Web response is invalidated, it is removed from the lower level cache.

It may be that a server computer system receives a client Web request for a Web response that is to include requested content contained in a data table. The data table may be a data table that is generally accessible to other applications that can alter content in the data table, including the requested content. The server computer system determines that at least a portion of the content that is to be included in the Web response is not currently cached at the server computer system. The server computer system accesses the requested content from the data table and constructs the Web response to include the requested content.

The server computer system assigns a database cache dependency to at least a portion of the constructed Web response based on commands executed during construction of the Web response. Assigning a database cache dependency can include assigning the Web response to be dependent on the data table or assigning content based on data retrieved from the data table to be dependent on the data table. A database cache dependency can be assigned through the use of a directive or program code included in a page file (e.g., in an Active Server Pages ("ASP") file) that is processed at the server computer system to construct the Web response. The at least a portion of the constructed Web response is cached at the server computer system. Accordingly, in response to subsequent Web requests for the constructed Web response, the server computer system can retrieve the cached at least a portion of the constructed Web response. Retrieving cached content (potentially a complete Web response) conserves both server computer system resources (since portions of the page file are not re-executed) and network and database resources (since the database is not re-queried and thus data is not transferred over a network). Accordingly, latency is reduced by reducing the processing and resources required to respond to a Web request, and scalability is increased by reducing the simultaneous access to shared resources, such as the database.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
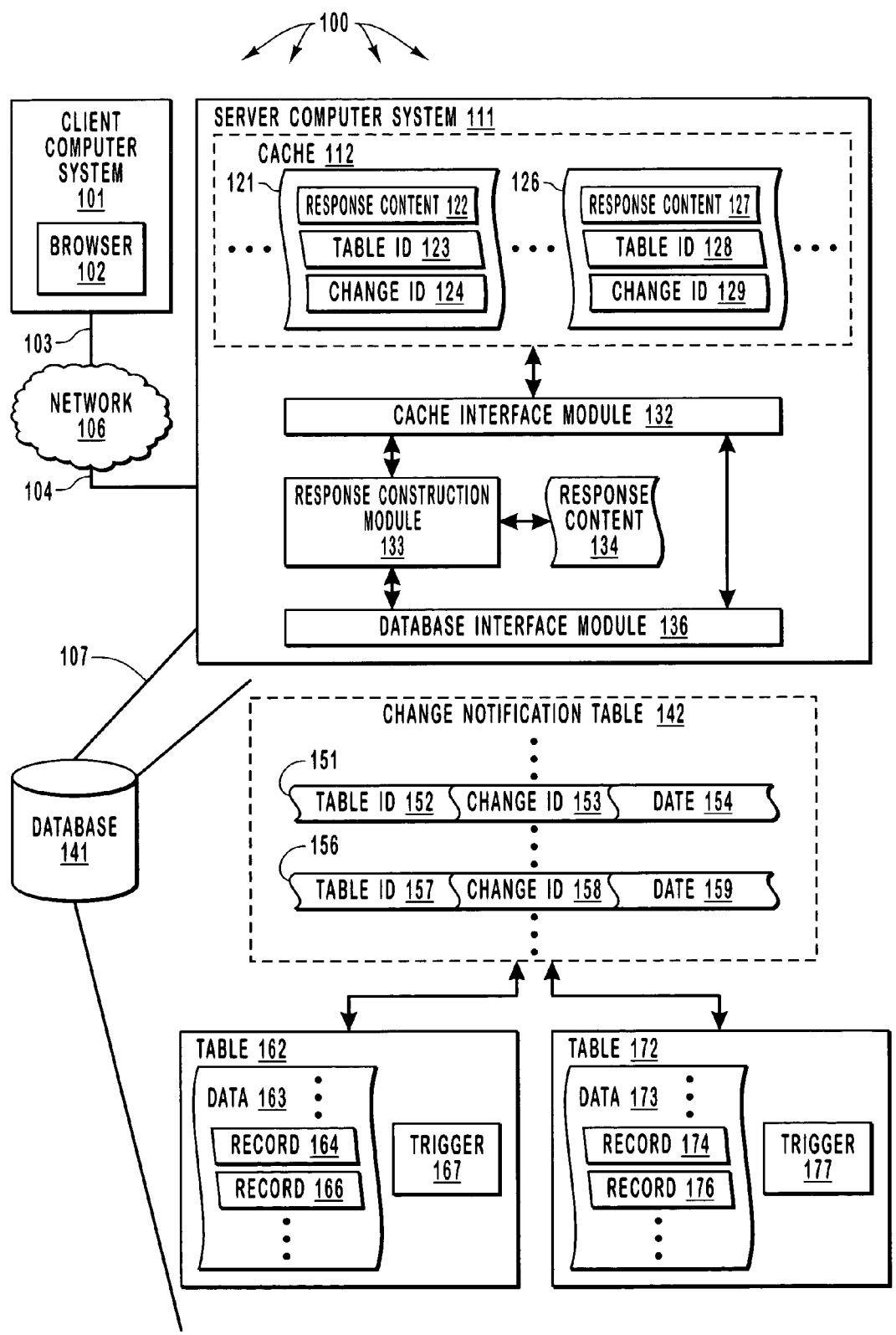
FIG. 1 illustrates an example network architecture that facilitates configuring cache entries to be dependent on and invalidating cache entries based on changes in database tables in accordance with the principles of the present invention.

The present invention extends to methods, systems, computer program products, and data structures for registering for and retrieving database table change information that can be used to invalidate cache entries. A client computer system with a browser is network connectable to server computer system that can generate and provide Web responses (e.g., Web page and/or results from Web services) to the client computer system. The server computer system accesses at least some of the content for Web responses from data tables in a database. The server computer system maintains a cache (e.g., in system memory) that can store provided content (including content from data tables) so as to increase the efficiency of subsequently providing the same content to satisfy client Web requests.

The server computer system (e.g., in response to user input) configures a data table in the database to provide a change notification table with updated versioning information (e.g., change IDs) when content in the data table is altered (e.g., inserted, deleted, updated). The server computer system queries the change notification table from time to time or in response to a request to retrieve cached content to request updated versioning information for corresponding data tables. In response, the database provides updated versioning information for data tables corresponding to the query. The server computer system can use updated versioning information to invalidate cache entries (e.g., based on previously assigned database cache dependencies).

In some embodiments, the server computer system receives a client Web request for a Web response that is to include requested content contained in a data table. The server computer system determines that at least a portion of the content that is to be included in the Web response is not currently cached at the server computer system. The server computer system accesses the requested content from the data table and constructs the Web response to include the requested content. The server computer system assigns a database cache dependency to at least a portion of the constructed Web response based on commands executed during construction of the Web response. The at least a portion of the constructed Web response is cached at the server computer system.

Embodiments of the present invention may comprise a special purpose or general-purpose computer including various computer hardware and software, as discussed in greater detail below. In particular, embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other physical storage media, such as optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device, such as a Graphical Processing Unit ("GPU"), to perform a certain function or group of functions.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

In this description and in the following claims, a "Web response" is defined as a human-readable page, such as, for example, a Web page, and/or results from Web service. A Web page can be retrieved from a network, such as, for example, the World Wide Web ("WWW") by accessing a corresponding Uniform Resource Locator ("URL"). A Web page can include one or more HyperText Markup Language ("HTML") instructions that are presentable at a Web browser, such as, for example, browser 102. A Web service provides a mechanism for different applications from different sources to communicate (potentially independent of user interaction) without having to develop custom instructions. Web services can integrate a number of different technologies, such as, for example, Extensible Markup Language ("XML") for tagging data, Simple Object Access Protocol ("SOAP") for transferring data, Web Services Description Language ("WSDL") for describing available services, and Universal Description, Discovery and Integration ("UDDI") for listing available services. Web services can share business logic, data, and processes through a programmatic interface across a network.

In this description and in the following claims, a "Web request" is defined as a request for a "Web Response". It may be that a user enters appropriate commands at a user interface to initiate a Web request. For example, a user at client computer system 101 can enter appropriate commands at browser 102 to access a URL corresponding to a Web page. On the other hand, it may be that an application initiates a Web request. For example, a Web services application at client computer system 101 can initiate a Web request to a Web services application at server computer system 111.

Those skilled in the art will appreciate that the invention may be practiced with many types of computer system configurations, including, personal computers, laptop computers, multi-processor systems, minicomputers, mainframe computers, and the like. The invention may also be practiced in distributed system environments where local and remote computer systems, which are linked (either by hardwired links, wireless links, or by a combination of hardwired and wireless links) through a network, both perform tasks. In a distributed system environment, program modules and associated data structures may be located in both local and remote memory storage devices.

Turning now to FIG. 1, FIG. 1 illustrates an example network architecture 100 that facilities configuring cache entries to be dependent on and invalidating cache entries based on changes in database tables in accordance with the principles of the present invention. The rectangular elements in network architecture 100 (e.g., browser 102, cache interface module 132, response construction module 133, database interface module 136, trigger 167, and trigger 177) represent executable modules that facilitate the principles of the present invention. The scrolled elements (cache entries 121 and 126, response content 134, records 151 and 156, and data 163 and 164) represent data that is processed by the executable modules. Accordingly, the executable modules and scrolled elements depicted in network architecture 100 cooperatively interact to implement the principles of the present invention.

Within network architecture 100, client computer system 101 and server computer system 111 are each connected to network 106 by corresponding links 103 and 104 respectively. Network 106 can be a local area network ("LAN"), a wide area network ("WAN"), or even the Internet. Client computer system 101 includes browser 102, which can send Web requests (e.g., HyperText Transfer Protocol ("HTTP") requests) for Web pages and can receive Web pages that are returned to computer system 101 in response to a Web request. Browser 102 can also present received Web page content (e.g., text, graphics, video, and audio) at client computer system 101. Client computer system 101 can also include Web service applications that communicate with corresponding Web service applications at server computer system 111.

Server computer system 111 includes response construction module 133 that can construct Web responses in response to client Web requests. Response construction module 133 can process page files, such as, for example, Active Server Pages ("ASP") files, to construct Web pages. A page file can include instructions and/or commands from a variety of different languages, such as, for example, HyperText Markup Language ("HTML"), Extensible Markup Language ("XML"), JavaScript, and VBScript. Response construction module 133 can process instructions and/or commands in a page file to generate content for a Web response. Response construction module 133 can be configured to generate Web pages, for example, in response to a Web request from a browser, and configured to generated Web service results, for example, in response to a Web request from a Web service application.

Server computer system 111 is connected to database 141 (e.g., a SQL database) by link 107. Database interface module 136 can transfer database commands via link 107 to database 141. Database commands can be used to manipulate content (e.g., to add, to delete, or to change rows or records) in or retrieve content from database 141. Database interface module 136 can receive user-input (e.g., from a keyboard or mouse) that is translated into database commands and transferred to database 141. Alternately, database interface module 136 can receive input from response construction module 133 requesting content for inclusion in a Web response. In response, database interface module 136 can retrieve content from database 141 and provide the retrieved content to response construction module 133. Response construction module 133 can combine retrieved content with static content in response content 134 to construct an appropriate Web response.

Database 141 can store versioning information for data tables contained in database 141. Database interface module 136 can retrieve versioning information for data tables and provide retrieved versioning information to cache interface module 132. Cache interface module 132 can utilize retrieved versioning information to determine when to invalidate (and subsequently remove) entries from cache 112. For example, based on retrieved versioning information cache interface module 132 can determine when to invalidate cache entry 121 or cache entry 126. Cache 112 can be a storage location with decreased latency, such as, for example, system memory of server computer system 111.

Versioning information can be stored in versioning information data structures that represent versions of data tables contained in database 141. One of the fields of a versioning information data structure can be a table ID field that represents a table ID identifying a data table in database 141. A table ID can be a value, for example, including numeric and/or alphabetic characters, that uniquely identifies a data table. For example, the table ID "Sales Table 3" may be used to identify table 162.

Another of the fields of a versioning information data structure can be a change ID field that represents a change ID for a data table identified by a corresponding table ID. A change ID can be a value, for example, including numeric characters, that identifies a current version of a data table. When content in a data table is changed, a corresponding change ID can be updated (e.g., by incrementing the change ID). For example, when content is inserted into table 172, change ID 158 can be incremented. Another of the fields of a versioning information data structure can be a date field representing a date when database 141 began tracking versions for a data table identified by a corresponding table ID. For example, date 154 can indicate when database 141 began tracking versioning information for table 162. Accordingly, a versioning information data structure may be of the format:

```
Versioning_Information
{
    Table ID Field,
    Change ID Field,
    Date Field
}
```

One or more versioning information data structures can be stored as records in a change notification table contained in database 141. For example, change notification table 142 includes records 151 and 156. Further, each series of three vertical periods (i.e., each vertical ellipsis) within change notification table 142 represents that change notification table 142 can include other records. Each record in change notification 142 corresponds to a data table that has been configured to track versioning information. For example, records 151 and 156 may correspond to tables 162 and 172 respectively. Accordingly, table ID 152 can store a value used to identify table 162, change ID 153 can store a value indicating the current version of table 162, and date 154 can store a value indicating when database 141 began tracking versioning information for table 162. Likewise, table ID 157 can store a value used to identify table 172, change ID 158 can store a value indicating the current version of table 172, and date 159 can store a value indicating when database 141 began tracking versioning information for table 172.

A data table can be configured to track versioning information through the use of a corresponding database trigger (e.g., a portion of computer-executable instructions) that updates an appropriate change ID in a change notification table. When content in the data table is altered, the database trigger is executed and the appropriate change ID is updated. For example, when data in record 164 is altered, trigger 167 can be executed to update the value of change ID 153. Similarly, when record 176 is inserted into data 173, trigger 177 can be executed to update the value of change ID 158. An administrator or user of database 141 (or alternately of server computer system 111) can enter user-input that causes an appropriate trigger to be associated with a data table.

Table 162 and table 172 are data tables contained in database 141. Each of tables 162 and 172 can include content that is potentially retrieved by database interface module for inclusion in a Web response. For example, tables 162 and table 172 can include corporate inventory and sales information respectively. Content in a data table can be represented by one or more records. For example, data 163 is represented by records 164 and 166 (and potentially other records represented by the vertically ellipses). Likewise, data 173 is represented by records 174 and 176 (and potentially other records represented by the vertically ellipses).

Database interface module 136 can transfer commands to database 141 (or other databases) that cause content to be retrieved from database 141 (or the other databases). Retrieved content can be used as content for a Web response that is subsequently transferred to a requesting computer system. For example, server computer system 111 may receive a Web request from client computer system 101. The Web request can be transferred to response construction module 133 that processes a corresponding page file to construct a corresponding Web response. Response construction module 133 can check cache 112 to determine if the Web response (or a portion thereof) is stored in cached 112. When a Web response is stored in cache 112, the Web response can be returned directly to client computer system 101.

When a Web response is not stored in cache 112, scripts, including the corresponding page file, can be executed to determine a Web response. Execution of a script can include checking for, and using if available, a portion of the Web response stored in cache 112. When content is not stored in cache 112, executed scripts can request content from database 141. Accordingly, requests for content are transferred to database interface module 136, which can issue appropriate commands to retrieve changes IDs and table IDs and based changes IDs and table IDs retrieved requested content. For example, based on change ID 153 and table ID 152, database interface module 136 may subsequently retrieve data from table 162.

It may be that version information is retrieved before querying for data. For example, database interface module 136 can be configured to retrieve version information (e.g., one or more change IDs and one or more corresponding table IDs) before querying for data (e.g., data 163 and/or data 173). Retrieving version information before querying for data significantly reduces the likelihood of a race condition where data in a data table is changed after data is queried but before version information is retrieved.

Response construction module 133 can also determine if retrieved content is to be cached and if retrieved content is dependent on a data table. Response construction module 133 can transfer retrieved content that is to be cached, along with an indication of dependencies on any data tables (e.g., a Table ID and corresponding Change ID), to cache interface module 132. Cache interface module 132 can insert the retrieved content into cache 112. Accordingly, subsequent Web requests for the retrieved content can be processed with increased efficiency.

Cached content can be stored in cache entry data structures that represent cached content and corresponding dependencies. One of the fields of a cache entry data structure can be a page content field representing content that was (or is to be) returned to a client computer in a requested Web response. Page content can include a portion of a Web response (e.g., one or more records form a data table) or can include a complete Web response. For example, response content 122 may include content from records 164 and 166. Alternately, response content 122 may include a complete Web response that contains content from database 141, content from response content 134, and content from other locations (e.g., from other databases or from other Web services).

Another of the fields of a cache entry data structure can be a table ID field that represents a table ID identifying a data table in database 141. A table ID can be a value, for example, including numeric and/or alphabetic characters, retrieved from a change notification table. For example, when content is retrieved from table 162, table ID 152 may also be retrieved from change notification table 142. Accordingly, a table ID in cache 112 can correspond to a table ID in change notification table 142. For example, when content is retrieved from table 172, table ID 128 and table ID 157 may both identify table 172.

In some embodiments, a single table ID/change ID tuple, such as, for example, a key entry, is maintained in cache for each data table that is monitored. Any content that relies on a table can be made dependent on a corresponding key entry. Accordingly, it may be that a plurality of cache entries is made dependent on the same key entry. When the table identified by a table ID changes, the corresponding change ID can be updated in the key entry or the key can be removed. Updating or removing a key entry causes any dependent cache entries (e.g., cache entry 126) to be removed from cache. Having a single key dependency invalidate multiple cache entries reduces the number of queries and version comparisons required in order to maintain cache entries. Accordingly, key entries can be used to increase the efficiency of determining when dependent content is to be invalidated.

Another of the fields of a cache entry data structure can be a change ID field that represents a change ID for a data table identified by a corresponding table ID. A change ID can be a value, for example, including numeric characters, retrieved from a change notification table. For example, when content is retrieved from table 162, change ID 153 may also be retrieved from change notification table 142. Accordingly, a change ID in cache 112 can correspond to a change ID in change notification table 142. For example, at the time data is retrieved from table 172, change ID 129 and change ID 158 may be equivalent. Accordingly, a cache entry data structure may be of the format:

```
Cache_Entry
{
    Page Content,
    Table ID Field,
    Change ID Field
}
```

One or more cache entry data structures can be stored in cache 112. For example, cache 112 includes cache entries 121 and 126. Further, each series of three periods (i.e., each ellipsis) within cache 112 represents that cache 112 can include other cache entries. Each cache entry in cache 112 corresponds to a portion of content that was included in a previously constructed Web response. For example, cache entries 121 and 126 include response content 122 and 127 respectively, which may have been included in Web responses (or may be Web responses) that were delivered to client computer system 101.

From time to time, server computer system 111 can query database 141 for versioning information. For example, database interface module 136 can be configured to query database 141 at specified intervals (e.g., every five seconds). In response to receiving a query, database 141 can return versioning information for any data tables that have been altered since the last polling signal was received. A query can be a specific request for data tables that have versioning information different form the versioning information included in the query. Database interface module 136 can receive versioning information returned from database 141 in response to a query. Database interface module 136 can transfer received versioning information to cache interface module 132. Cache interface module 132 can process received versioning information to identify cache entries that are to be invalidated and potentially removed from cache 112. Alternately, cache interface module 132 can process received versioning information to update appropriate key entries within cache 112.

In an alternate embodiment, server computer system 111 can query database 141 for versioning information that has changed, and request that the query not return until some changes are determined. For example, database interface module 136 can be utilized to issue a blocking query for each table being monitored. The issued blocking query can include current held version information for each monitored table. Upon receiving the issued blocking query, database 141 waits until the version information for one or more of the requested tables is updated. In response to the update, database 141 can return the TableID and version information for the changed table(s). Blocking queries can be executed synchronously, such that the request for data does not return until change information is available. On the other hand, blocking queries can be executed asynchronously, such that the request returns immediately, and a callback is called in server computer system 111 when change information is available.

Figure 2:
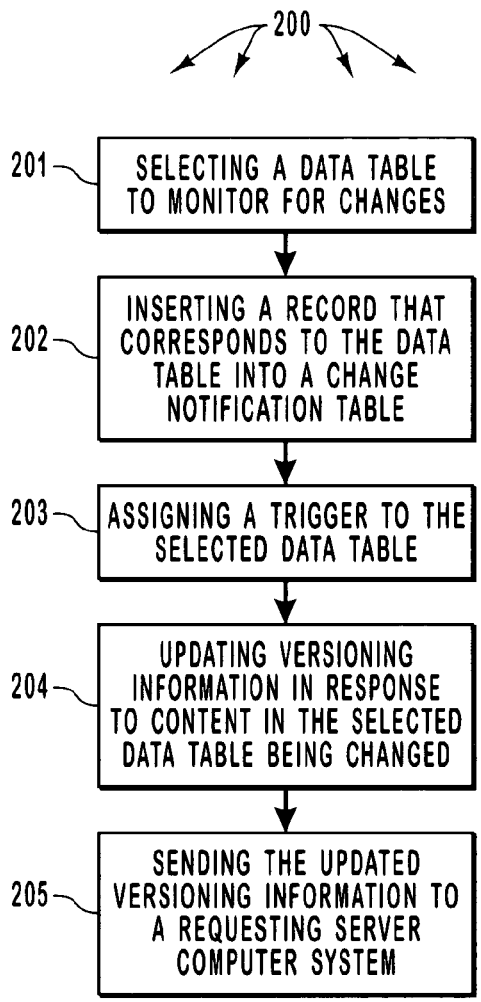
FIG. 2 illustrates an example flowchart of a method for configuring a database to provide table change notifications in accordance with the principles of the present invention.

FIG. 2 illustrates an example flowchart of a method for 200 configuring a database to provide table change notifications in accordance with the principles of the present invention. The method 200 will be discussed with respect to the computer systems and database depicted in network architecture 100. The method 200 includes an act of selecting a data table to monitor for changes (act 201). Act 201 can include a computer system that is network connectable to (or contains) a database selecting a data table from the database that is to be monitored for content changes. Selecting a data table to monitor for changes can include database interface module 136 receiving user-input identifying a data table that is to be monitored. For example, an administrator of server computer system 111 and/or database 141 can submit commands selecting table 162 and/or table 172 for monitoring. When a change notification table does not already exist, an administrator can also enter commands to create the change notification table. For example, an administrator of server computer system 111 and/or database 141 can submit commands to database 141 to cause change notification table 142 to be created.

Alternately, computer system 111 may automatically submit commands selecting a data table for monitoring in response to receiving a Web request for a corresponding Web response that is to include content from the selected data table. For example, in response to receiving a Web request for a corresponding Web response that will include content from table 162 and/or table 172, server computer system 111 can automatically submit commands selecting table 162 and/or table 172 for monitoring. When a change notification table does not already exist, server computer system 111 may automatically, for example, based on page directives within the script, submit commands that cause the change notification table to be created. For example, in response to receiving a Web request for a corresponding Web response that will include content from a data table in database 141, server computer system 111 can automatically submit commands that cause change notification table 142 to be created. Database interface module 136 can transfer user-input and/or automatically generated change notification table creation commands and data table selection commands to database 141.

The method 200 includes an act of inserting a record that corresponds to the data table into a change notification table (act 202). Act 202 can include inserting a record that corresponds to the data table into a change notification table when the change notification table does not already include a record corresponding to the data table. For example, a computer system that is network connectable to (or contains) a database can insert a record that corresponds to the selected data table into a change notification table. An inserted record can include versioning information (e.g., represented by a versioning information data structure) that corresponds to the selected data table. Inserting a record into a change notification table can include database interface module 136 receiving user-input that indicates a record is to be inserted into a change notification table.

For example, an administrator of server computer system 111 and/or database 141 can submit commands that cause records 151 and 156 to be inserted into change notification table 142. Alternately, computer system 111 may automatically submit commands that cause records to be inserted into a change notification table in response to receiving a Web request for a corresponding Web response that is to include content from a corresponding selected data table. For example, in response to receiving a Web request for a corresponding Web response that will include content from table 162 and/or table 172, server computer system 111 can automatically submit commands that cause records 151 and 156 to be inserted into change notification table 142. Database interface module 136 can transfer user-input or automatically generated record insertion commands to database 141.

The method 200 includes an act of assigning a trigger to the selected data table (act 203). Act 203 can include assigning the trigger to the selected data table when the trigger is not already assigned to the selected data table. For example, a computer system that is network connectable to (or contains) a database can assign a trigger to the selected data table. An assigned trigger can cause versioning information for the selected data table to be updated in the change notification table when content in the selected data table is altered. For example, trigger 167 can cause change ID 153 to be updated (e.g., incremented) when content in table 162 is altered (e.g., when a record is inserted into, removed from, or changed in data 163). Similarly, trigger 177 can cause change ID 158 to be updated (e.g., incremented) when content in table 172 is altered (e.g., when a record is inserted into, removed from, or changed in data 173).

Assigning a trigger can include database interface module 136 receiving user-input that indicates a trigger is to be assigned to selected data table. An administrator of server computer system 111 and/or database 141 can submit commands that cause a trigger to be assigned to a selected data table. For example, an administrator can submit input that causes trigger 167 to be assigned to table 162 and trigger 177 to be assigned to table 172. Alternately, computer system 111 may automatically assign a trigger in response to receiving a Web request for a corresponding Web response that is to include content from a corresponding selected data table. For example, in response to receiving a Web request for a corresponding Web response that will include data from table 162 and/or table 172, server computer system 111 can automatically submit commands that cause trigger 167 to be assigned to table 162 and/or cause trigger 177 to be assigned to table 172. Database interface module 136 can transfer user-input or automatically generated trigger assignment commands to database 141.

A trigger can include a portion of computer-executable instructions that are attached to a table. A trigger can be event driven such that the portion of computer-executable instructions is executed when the event occurs. For example, trigger 167 can be configured to activate when content in data 163 is altered and can include a portion of computer-executable instructions that cause change ID 153 to be incremented.

The method 200 includes an act of updating versioning information in response to content in the selected data table being changed (act 204). Act 204 can include a computer system that is network connectable to (or contains) a database updating versioning information in response to the selected data table being changed. For example, when content in data 162 is altered (either automatically or as a result of user-input) a computer system can execute the portion of computer-executable instructions included in trigger 167 to cause change ID 153 to be incremented.

The method 200 includes an act of returning the updated versioning information to a requesting server computer system (act 205). Act 205 can include returning the updated versioning information to a requesting server computer system such that the updated versioning information can be used to determine the validity of content in a cache entry at the server computer system. For example, database 141 can send records 151 and 156 (or portions thereof) to server computer system 111 in response to a query from server computer system 111. Database interface module 136 can receive data records from database 141. Database interface module 136 can transfer data from records 151 and 156 (e.g., table IDs 152 and 157 and change IDs 153 and 158) to cache interface module 132 for use in identifying cache entries that are to be invalidated.

In some embodiments, cached content is in the form of objects or results used to generate a Web response, such as tabular data, objects, collections, or partial Web responses. Caching these interim results is appropriate when the results can be used in the generation of more than one Web response, where each Web response contains additional differentiating information (e.g., customization or the inclusion of other relevant information). In other embodiments, an entire Web response is cached. Caching an entire Web response is appropriate when the Web entire response can be shared across multiple different Web requests. When caching a complete Web response, the Web response may be pushed down to be cached in lower levels of the server computer system, for example, a kernel-mode response cache. Accordingly, when the Web response is invalidated, it is removed from the lower level cache.

Figure 3:
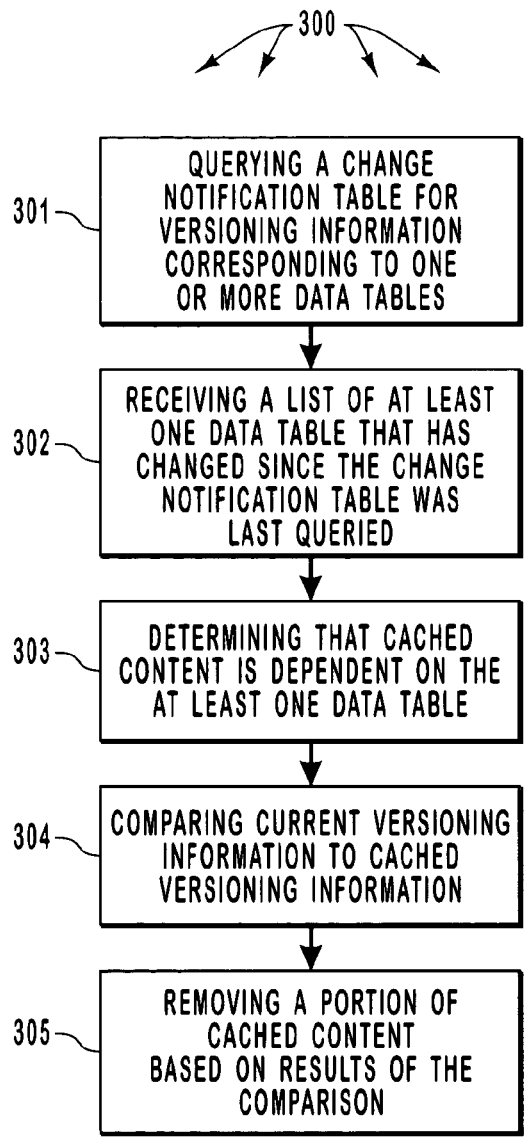
FIG. 3 illustrates an example flowchart of a method for invalidating a portion of cached content in accordance with the principles of the present invention.

FIG. 3 illustrates an example flowchart of a method 300 for invalidating a portion of cached content in accordance with the principles of the present invention. The method 300 will be discussed with respect to the computer systems and database depicted in network architecture 100. Method 300 includes an act of querying a change notification table for versioning information corresponding to one or more data tables (act 301). Act 301 can include a server computer system, which constructs Web responses that include content from the one or more data tables, querying the change notification table for versioning information corresponding to the one or more data tables. For example, database interface module 136 can query change notification table 142 for versioning information corresponding to tables 162 and 163. Database interface module 136 can query change notification table 142 as a result of received user-input, the occurrence of a specified polling interval, in response to a request to retrieve cached content, or a blocking query initiated prior to requesting data from the dependent table.

A query can be configured to request versioning information for all monitored data tables represented in the change notification table, to request versioning information for monitored data tables with outstanding cache dependencies, or to request versioning information for monitored data tables that have changed (e.g., by including current versioning information in the query). In response to a query, updated versioning information is returned from the database to the server computer system. Based on the configuration of the query, the database can return, for example, versioning information for all monitored data tables, versioning information for monitored data tables with outstanding cache dependencies, or versioning information for monitored data tables that have changed.

Alternatively, the server computer system can issue a query to the change notification table and request that the issued query block on the server computer system until the versioning information for a requested table(s) is updated. For example, the server computer system can issue a query that blocks on the server computer system until current version information becomes greater than a specified threshold. The issued blocking query can be executed synchronously, such that a corresponding thread on the server computer system blocks until results are available. On the other hand, the issued blocking query can be executed asynchronously, such that a corresponding thread on the server computer system is not blocked and a callback is invoked on the server computer system (e.g., on a separate thread) when results are available.

The method 300 includes an act of receiving a list of at least one data table that has changed since the change notification table was last queried (act 302). Act 302 can include a server computer system, which constructs Web responses including content from the at least one data table, receiving a list of at least one data table that has changed since the server computer system last queried the change notification table. A list of at least one data table can include current versioning information for the at least one data table. For example, database 141 can return a list of data tables including versioning information for table 162 (e.g., table ID 152 and change ID 153) and versioning information for table 172 (e.g., table ID 157 and change ID 158) to server computer system 111. Database interface module 136 can receive a list of data tables returned from database 141.

The method 300 includes an act of determining that cached content is dependent on the at least one data table (act 303). Act 303 can include a server computer system, which constructs Web responses that include content from the at least one data table, determining that cached content is dependent on the at least one data table. For example, server computer system 111 can determine that response content 122 is dependent on table 162 and response content 127 is dependent on table 172. Cache interface module 132 can compare received table IDs (table IDs 152 and 157) and to corresponding cached table IDs (tables IDs 123 and 128). When a comparison of table IDs so indicates (e.g., when a received table ID and cached table ID identifying the same data table), cache interface module 132 determines that cached content is dependent on a data table. For example, when the value of table ID 123 matches the value of table ID 152, cache interface module 132 can determine that response content 122 is dependent on table 162. Similarly, when the value of table ID 128 matches the value of table ID 157, cache interface module 132 can determine that response content 127 is dependent on table 172.

The method 300 includes an act of comparing current versioning information to cached versioning information (act 304). Act 304 can include a server computer system, which constructs Web responses that include content from the at least one data table, comparing current versioning information to cached versioning information. For example, server computer system 111 can compare versioning information from a returned list to versioning information contained in cache 112. Cache interface module 132 can compare received change IDs (change IDs 153 and 158) and to corresponding cached change IDs (change IDs 124 and 129).

The method includes an act of removing a portion of cached content based on results of the comparison (act 305). Act 305 can include a server computer system, which constructs Web responses that include content from the at least one data table, removing a portion of the cached content based on results of the comparison. For example, server computer system 111 can remove cached content from cache 112 based on a comparison of current versioning information to cached versioning information. When a comparison of change IDs so indicates (e.g., when the value of a received change ID is greater than the value of a cached change ID), cache interface module 132 removes cached content. For example, when change ID 153 is greater than change ID 124, cache interface module 132 can remove cache entry 121 from cache 112. Similarly, when change ID 158 is greater than change ID 129, cache interface module 132 can remove cache entry 126 from cache 112. When change IDs are equal cached content is not removed from cache 112.

Accordingly, through the use of database cache dependencies, there is an increased likelihood of appropriately invalidating cached content. When a data table has not changed, there is a decreased chance of pre-maturely removing valid dependent content from cache. Thus, valid dependent content from cache can be used to more efficiently construct Web responses. On other hand, when a data table has changed, there is an increased chance of removing corresponding invalid dependent content from cache. Thus, invalid dependent content is potentially prevented from being included in a Web response.

Figure 4:
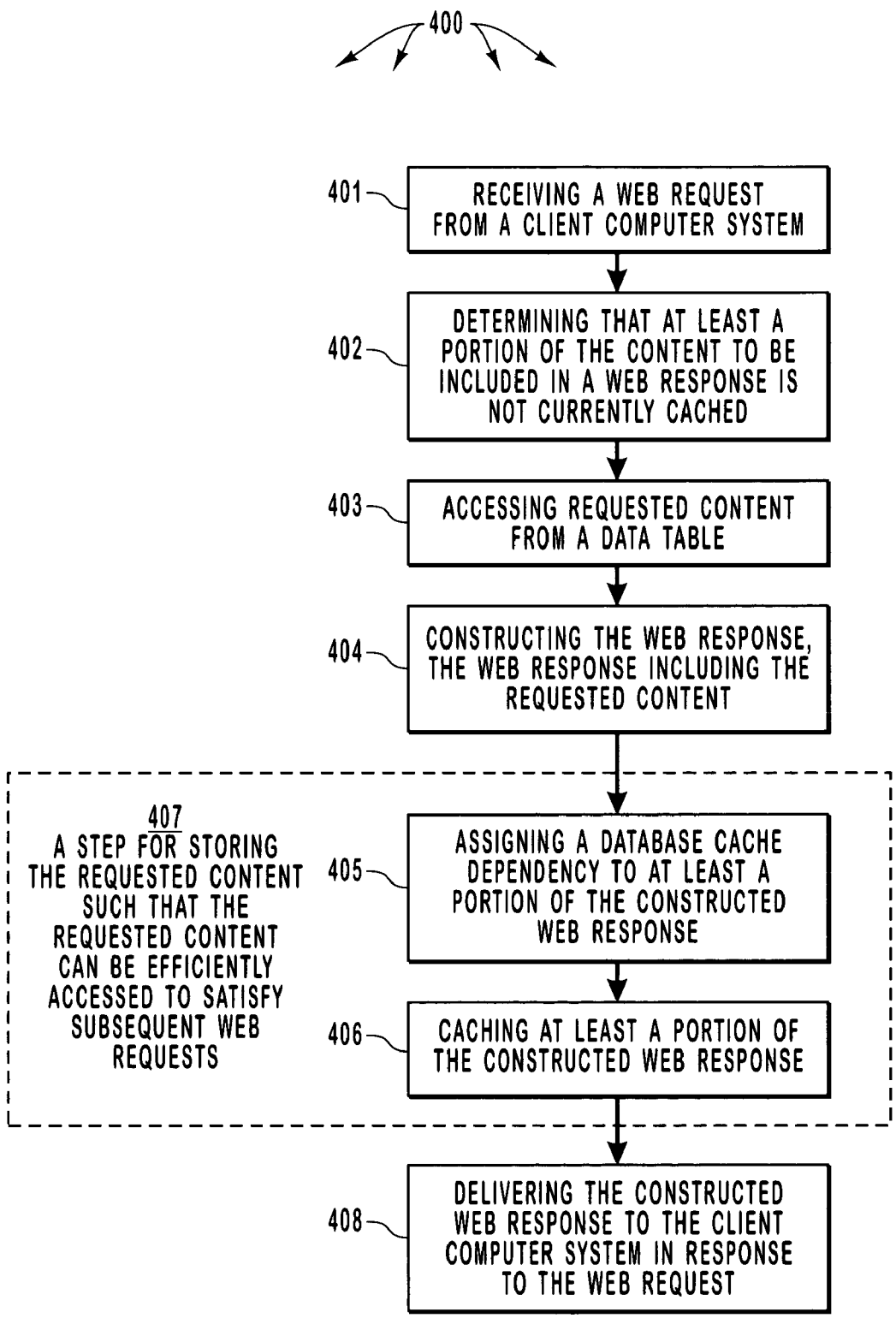
FIG. 4 illustrates an example flowchart of a method for accessing content to present to a requesting client computer system in accordance with the principles of the present invention.

FIG. 4 illustrates an example flowchart of a method 400 for accessing content to present to a requesting client computer system in accordance with the principles of the present invention. The method 400 will be discussed with respect to the computer systems and database depicted in network architecture 100. The method 400 includes an act of receiving a Web request from a client computer system (act 401). Act 401 can include a server computer system, which constructs Web responses that include content from at least one data table, receiving a Web request from a client. For example, server computer system 111 can receive a Web request from client computer system 101 (e.g., originating as a result of user-input received at browser 102). A Web request can result, for example, when browser 102 accesses a Uniform Resource Locator ("URL") corresponding to a Web response.

A Web request can request delivery of a Web response that is to include requested content contained in a data table. For example, a Web request from client computer system 101 can be a request for Web response that is to include content from table 162 and/or table 172. Tables 162 and 172 can be generally accessible to other application (e.g., work flow or inventory applications) that can alter content contained in the tables 162 and 172 (including content that is to be included in the requested Web response). Accordingly, it may be that content included in data 163 and data 173 is altered by these other applications in between Web requests.

In response to receiving a Web request, server computer system 111 may determine that an entire corresponding Web response is stored in cache 112 (or in a lower level cache). When the entire corresponding Web response is cached, server computer system 111 can return the entire cached Web response from cache 112 without requiring any further processing as a result of the Web request. Accordingly, when an entire Web response is cached, latency associated with fulfilling a Web request can be significantly reduced.

On the other hand, in response to receiving a Web request, server computer system 111 may determine that at least a portion of a corresponding Web response is not current cached. The method 400 includes an act of determining that at least a portion of the content to be included in a corresponding Web response is not currently cached (act 402). Act 402 can include a server computer system, which constructs Web responses that include content from at least one data table, determining that at least a portion of the content that is to be included in the Web response is not currently cached at the server computer system. For example, server computer system 111 can determine that at least a portion of content that is to be included in a Web response to be delivered to client computer system 101 is not currently cached at computer system 111.

A Web request received at server computer system 111 can be transferred to response construction module 133. Accordingly, response construction module 133 can retrieve an appropriate page file (e.g., an ASP file) and process the page file to construct a corresponding Web response. Scripts included in the page file can request content stored at locations external to server computer system 111 (e.g., at tables 162 and/or 163). When a request for external content is processed, response construction module 133 can send appropriate instructions to cache interface module 132 to cause cached interface module 132 to attempt to locate the external content in cache 112. When the external content is stored in cache 112, cache interface module 132 can respond to response construction module 133 indicating that the external content is stored in cache 112. On the other hand, when external content is not stored in cache 112, cache interface module 132 can respond to response construction module 133 indicating that the external content is not stored in cache 112.

When it is determined that at least a portion of the content to be included in a Web response is not cached, server computer system 111 can further determine if the at least a portion of the content depends on any data tables in database 141. When the at least a portion of the content is dependent on a data table in database 141, server computer system 111 can further determine if a corresponding key entry for the data table is stored in cache 112. When a corresponding key entry is not stored in cache 112, server computer system 111 can retrieve appropriate version information for the data table (e.g., from change notification table 142) and store a corresponding key entry including the appropriate version information, in cache 112.

The method 400 includes an act of accessing requested content from a data table (act 403). Act 403 can include a server computer system, which constructs Web responses that include content from at least one data table, accessing the requested content from the data table. For example, server computer system 111 can access requested content from a data table in database 141. In response, to an indication that requested content is not stored in cached 112, response construction module 133 can send appropriate instructions (e.g., by issuing a query) to database interface module 136 to cause database interface module 136 to attempt to locate the requested content in database 141. Database 141 can locate the requested content (e.g., in records 164, 166, 174, and/or 176) and return the requested content to database interface module 136. Database interface module 136 can then transfer the requested content to response construction module 133.

The method 400 includes an act of constructing the corresponding Web response, the Web response including the requested content (act 404). Act 404 can include a server computer system, which constructs Web responses that include content from at least one data table, constructing the Web response. For example, server computer system 111 can include content from database 141 in a Web response that is to be returned to client computer system 101. Response construction module 133 can include requested content (e.g., from records 164, 166, 174, and/or 176) received from database interface module 136 to satisfy a Web request. Based on the requested content (as well as potentially on other HTML and XML commands and scripts included in an appropriate page file), response construction module 133 can generate an appropriate Web response.

The method 400 includes a functional result-oriented step for storing the requested content such that the requested content can be efficiently accessed to satisfy subsequent Web requests (step 407). Step 407 can include any corresponding acts for storing the requested content such that the requested content can be efficiently accessed to satisfy subsequent Web requests. However, in the example method in FIG. 4, step 407 includes a corresponding act of assigning a database cache dependency to at least a portion of the constructed Web response (act 405). Act 405 can include a server computer system, which constructs Web responses that include content from at least one data table, assigning a database cache dependency to at least a portion of the constructed Web response.

The step 407 also includes a corresponding act of caching at least a portion of the constructed Web response (act 406). Act 406 can include a server computer system, which constructs Web responses that include content from at least one data table, caching at least a portion of the constructed Web response. The server computer system can cache the at least a portion of the constructed Web response in a cache location at the server computer system. For example, cache interface module 132 can cause at least a portion of a constructed Web response constructed by response construction module 133 to be stored in cache 112 prior to the constructed Web response being delivered to client computer system 101.

When caching an entire Web response, the Web response may be pushed down to be cached in lower levels of a server computer system, such as, in a kernel-mode response cache. For example, an entire Web response could be pushed to a cache location maintained by an Internet Information Server ("IIS") module. Accordingly, when the Web response is invalidated, it is removed from the lower level cache.

A database cache dependency can be assigned and at least a portion of content cached as a result of commands executed during Web response construction. In some embodiments, a database cache dependency is assigned to a portion of the content in a Web response. The following first example instructions can be included in a page file to cause a portion of content in a Web response to be assigned a database cache dependency:

```
1.  <HTML>
2.    <Script>
3.      SqlCacheDependency c;
4.      c = new SqlCacheDependency(pubs, products);
5.      ProductCollection p = getproducts( );
6.      Cache.Insert("Pinfo",p,c);
7.    </Script>
8.  </HTML>
```

Line 3 of the first example instructions creates a variable "c" of the data type SqlCacheDependency. SqlCacheDependency can be a data type that has been previously established for representing database cache dependencies. Line 4 of the first example instructions assigns the variable c to represent a dependency on the "products" table contained in the "pubs" database. This could represent, for example, a dependency on table 162 contained in database 141. Line 5 of the first example instructions creates a variable "p" of the data type "ProductCollection". ProductCollection can be a data type that has been previously established for representing lists of products retrieved from the products database. The "getproducts( )" function is executed at line 5 to return a list of products (e.g., from table 162 and/or 163) that are stored in the variable p.

Line 6 of the first example instructions creates a cache entry (e.g., in cache 112). The cache entry is created with a key of "Pinfo", which can be used to subsequently reference the cache entry. The cache entry is created to store the list of products represented by variable p (e.g., as response content 122) and the cache entry is dependent on the products table in the pubs database represent by variable c (e.g., as table ID 123). The first example instructions may be particularly advantageous when a plurality of Web responses are to include the same portion of content.

The following example instruction can be included in a page file to retrieve the cached list of products:

ProductCollection p=cache("Pinfo");

When it is detected that the products table in the pubs database is altered, the cache entry referenced by the key PInfo is invalidated. In other embodiments, a database cache dependency is assigned to an entire Web response. The following second example instructions can be included in a page file to cause an entire Web response to be assigned a database cache dependency:

```
1.  <% Output Cache SqlTableDepend="pubs:products" %>
2.  <HTML>
3.    <Script>
4.      ...
5.    </Script>
6.  </HTML>
```

Line 1 of the second example instructions is a directive that causes the entire Web response resulting from the page file to be dependent on the "products" table contained in the "pubs" database. A cache entry can be created to cache the entire Web response (e.g., as response content 127) that results from the page file. At line 4 an ellipsis indicates that other script instructions can be executed, such as, for example, to access the products table in the pubs database, when the page file is processed. The second example instructions may be particularly advantageous when a plurality of clients requests the same Web response.

It may be that a database cache dependency is used in combination with one or more other cache dependencies, such as, for example, a time, file, key, and/or Web service cache dependency or even another database cache dependency. For example, the following example directive can be included in a page file to cause an entire Web response to be assigned both a database cache dependency and a time dependency:

<% Output Cache Duration=600 s SqlTableDepend="pubs:customers" %>

The example directive would cause a corresponding Web response to remain cached for 600 seconds from the time the corresponding Web response was created or until the "customers" table in the "pubs" database was altered.

In some embodiments, one or more cache entries are key dependent cache entries that depend upon (i.e., are linked to) a database dependent cache entry (thus resulting in a key dependency). Accordingly, invalidating the database dependent cache entry causes each of the key dependent cache entries to also be invalidated. Since key dependent cache entries are dependent on other data in cache (e.g., in system memory), invalidating a key dependent cache entry is more efficient that invalidating a database dependent cache entry (which can require a database query, network communication, data serialization, etc). Accordingly, to increase the efficiency of invalidating cache entries, a first cache entry having dependent content can be configured to be dependent on a second cache entry (through a key dependency). When a change in the corresponding data table is detected, the second cache entry invalidates any dependent cache entries. In response to a detected change, the second cache entry can also be removed from cache or appropriate versioning information for the corresponding data table can be updated.

For example, it may be that cache entry 121 and cache entry 126 are both dependent on table 162 (e.g., table ID 123 and table ID 128 both correspond to table ID 152). To optimize the efficiency of determining when response content 122 and response content 127 is to be invalidated, a key entry dependent upon table 162 can be inserted into cache 112 (i.e., into system memory). Cache entries 121 and 126 can be made to depend on the inserted key entry. When table 162 is altered, a subsequent query of database 141 can identify that change ID 153 is updated and invalidate the inserted key entry. Invalidating the inserted key entry automatically invalidates cache entries 121 and 126 rather than requiring both change ID 124 and change ID 129 to be compared directly against change ID 153. Accordingly, the number of database queries and version comparisons can be reduced and network, database, and processing resources conserved.

The method 400 includes an act of delivering the constructed Web response to the client computer system in response to the Web request (act 408). Act 408 can include a server computer system, which constructs Web responses that include content from at least one data table, delivering the constructed Web response to the client computer system. For example, server computer system 111 can deliver a Web response to client computer system 101 in response to the Web request from client computer system 101. The delivered Web response can be a Web response constructed by response construction module 133.

Figure 5:
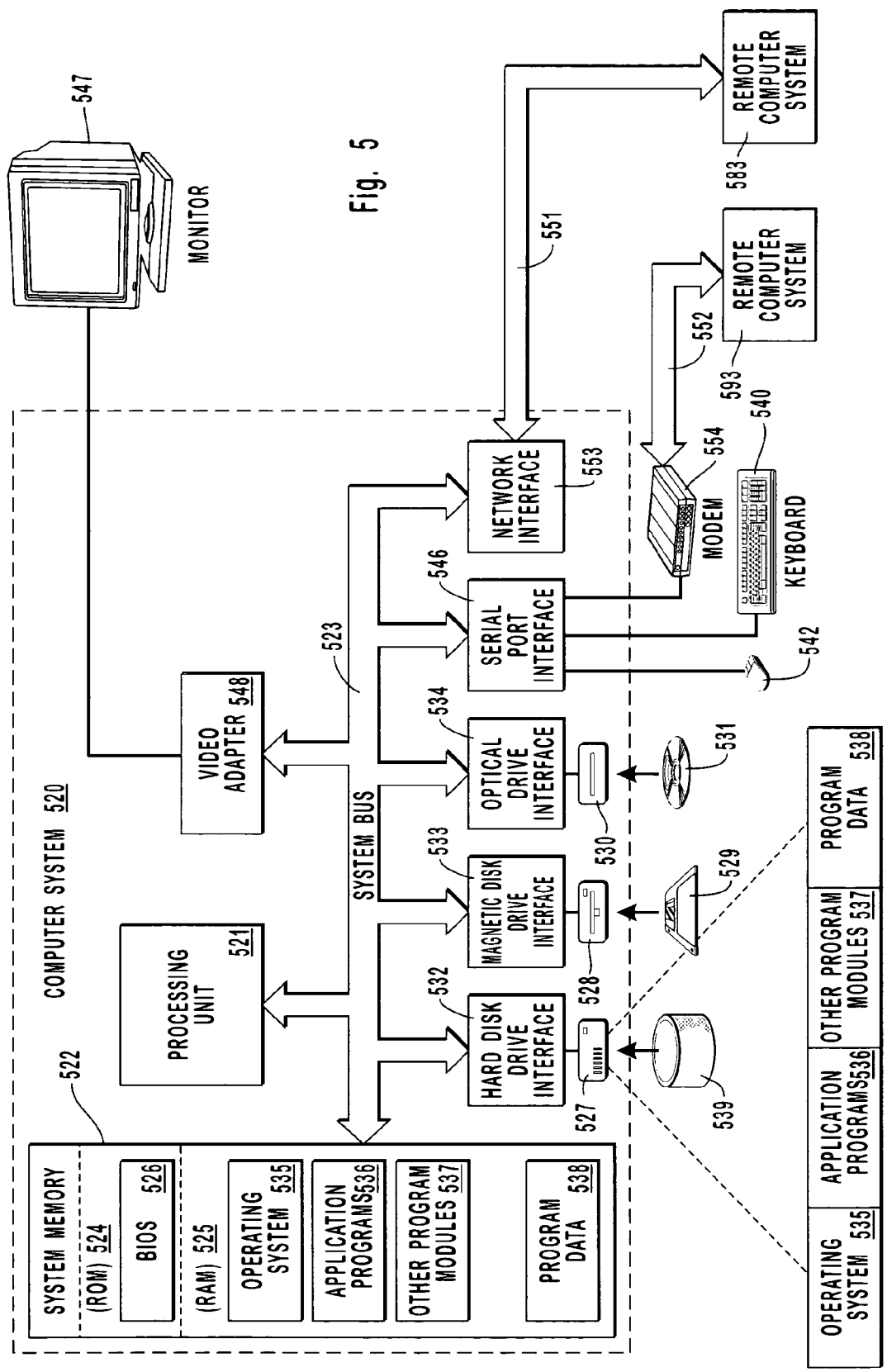
FIG. 5 illustrates a suitable operating environment for the principles of the present invention.

FIG. 5 illustrates a suitable operating environment for the principles of the present invention. FIG. 5 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 5, an example system for implementing the invention includes a general-purpose computing device in the form of computer system 520, including a processing unit 521, a system memory 522, and a system bus 523 that couples various system components including the system memory 522 to the processing unit 521. Processing unit 521 can execute computer-executable instructions designed to implement features of computer system 520, including features of the present invention. The system bus 523 may be any of several types of bus structures including a memory bus or memory controller, a peripheral bus, and a local bus using any of a variety of bus architectures. The system memory includes read only memory ("ROM") 524 and random access memory ("RAM") 525. A basic input/output system ("BIOS") 526, containing the basic routines that help transfer information between elements within the computer 520, such as during start-up, may be stored in ROM 524.

The computer system 520 may also include a magnetic hard disk drive 527 for reading from and writing to a magnetic hard disk 539, a magnetic disk drive 528 for reading from or writing to a removable magnetic disk 529, and an optical disk drive 530 for reading from or writing to removable optical disk 531, such as, or example, a CD-ROM or other optical media. The magnetic hard disk drive 527, magnetic disk drive 528, and optical disk drive 530 are connected to the system bus 523 by hard disk drive interface 552, magnetic disk drive-interface 533, and optical drive interface 534, respectively. The drives and their associated computer-readable media provide nonvolatile storage of computer-executable instructions, data structures, program modules, and other data for computer system 520. Although the example environment described herein employs a magnetic hard disk 539, a removable magnetic disk 529 and a removable optical disk 531, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 539, magnetic disk 529, optical disk 531, ROM 524 or RAM 525, including an operating system 535, one or more application programs 536, other program modules 537, and program data 538. A user may enter commands and information into the computer system 520 through keyboard 540, pointing device 542, or other input devices (not shown), such as, for example, a microphone, joy stick, game pad, scanner, or the like. These and other input devices can be connected to the processing unit 521 through serial port interface 546 coupled to system bus 523. Alternatively, input devices can be connected by other interfaces, such as, for example, a parallel port, a game port, a universal serial bus ("USB") port, or a Fire Wire port. A monitor 547 or other display device is also connected to system bus 523 via video adapter 548. Computer system 520 can also be connected to other peripheral output devices (not shown), such as, for example, speakers and printers.

Computer system 520 is connectable to networks, such as, for example, an office-wide or enterprise-wide computer network, an intranet, and/or the Internet. Computer system 520 can exchange data with external sources, such as, for example, remote computer systems, remote applications, and/or remote databases over such a network.

Computer system 520 includes network interface 553, through which computer system 520 receives data from external sources and/or transmits data to external sources. As depicted in FIG. 5, network interface 553 facilitates the exchange of data with remote computer system 583 via link 551. Link 551 represents a portion of a network, and remote computer system 583 represents a node of the network. For example, remote computer system 583 may maintain a database that provides content for Web responses constructed at computer system 520. On the other hand, computer system 583 may be a server computer that requested content from a database maintained at computer system 520.

Likewise, computer system 520 includes serial port interface 546, through which computer system 520 receives data from external sources and/or transmits data to external sources. Serial port interface 546 is coupled to modem 554, through which computer system 520 receives data from and/or transmits data to external sources. Alternately, modem 554 can be a Data Over Cable Service Interface Specification ("DOCSIS") modem or digital subscriber lines ("DSL") modem that is connected to computer system 520 through an appropriate interface. However, as depicted in FIG. 5, serial port interface 546 and modem 554 facilitate the exchange of data with remote computer system 593 via link 552. Link 552 represents a portion of a network, and remote computer system 593 represents a node of the network. For example, remote computer system 593 may be a client computer system that requests Web responses from computer system 520. On the other hand, computer system 593 may be a server computer system that provides Web responses to computer system 520.

While FIG. 5 represents a suitable operating environment for the present invention, the principles of the present invention may be employed in any system that is capable of, with suitable modification if necessary, implementing the principles of the present invention. The environment illustrated in FIG. 5 is illustrative only and by no means represents even a small portion of the wide variety of environments in which the principles of the present invention may be implemented.

Modules of the present invention, as well as associated data, can be stored and accessed from any of the computer-readable media associated with computer system 520. For example, portions of such modules and portions of associated program data may be included in operating system 535, application programs 536, program modules 537 and/or program data 538, for storage in system memory 522. When a mass storage device, such as, for example, magnetic hard disk 539, is coupled to computer system 520, such modules and associated program data may also be stored in the mass storage device. In a networked environment, program modules and associated data depicted relative to computer system 520, or portions thereof, can be stored in remote memory storage devices, such as, for example, system memory and/or mass storage devices associated with remote computer system 583 and/or remote computer system 593. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired secured by United States Letters Patent is:

1. In a computer system that accesses a database having one or more data tables, the computer system configured to provide content from the database to a Web server for inclusion in Web based responses to requests for Web based content, the computer system including a cache configured to cache database content included in Web based responses so as to provide more efficient access to the cached database content when formulating subsequent Web based responses, a method for formulating and caching a Web based response in response to receiving a Web based request for database content, the method comprising the following:

an act of determining whether a cache entry for Web based content requested by a request for Web based content already exists in the cache; and upon determining that the cache entry does not exist, performing the following:

an act of selecting a data table that is to be monitored for content changes, the selected data table selected from among the one or more data tables of the database;

an act of inserting a record for the selected data table into a separate change notification table, the record including versioning information identifying and corresponding to the selected data table, the versioning information retrievable by the Web server to determine when a corresponding cache entry containing cacheable content from the selected data table is invalid;

an act of assigning a trigger to the selected data table, the trigger configured to update the versioning information for the selected table in the change notification table when content in the selected data table is altered;

an act of caching interim results that can be used in the generation of a plurality of different Web based responses in a cache entry in the cache, the interim results based on one or more records from the selected data table, the cache entry made dependent on the selected data table by including the versioning information identifying and corresponding to the selected data table in the cache entry;

an act receiving a Web based request for a Web based response that is to include the interim results subsequent to caching the interim results in the cache entry, the web based request corresponding to a page file which includes one or more scripts to be executed to determine the Web based response;

an act of querying the change notification table for versioning information identifying and corresponding to the selected data table;

an act of receiving current versioning information identifying and corresponding to the selected data table;

an act of comparing the cached versioning information to the current versioning information;

an act of determining how to access the interim results for inclusion in a Web based response based on the results of comparing the versioning information and in response to receiving the Web based request for the portion of content, the act comprising an act of determining that the interim results are to be reconstructed from the one or more records in the selected data table and one or more records in one or more other data tables;

an act of accessing the interim results in accordance with the determination, the act comprising an act of reconstructing the interim results from one or more records in the selected data table and the one or more records in the one or more other data tables not withstanding that interim results were cached at the computer system when the Web based request was received;

an act of executing commands included in the one or more scripts in the page file to construct a Web based response responsive to the Web based request based on the interim results; and based on the commands executed during the construction of the Web based response:

an act of assigning a database cache dependency to at least a portion of the constructed Web based response, the executed commands defining at least one database and at least one table on which the database cache entry is dependent, and further defining the portion of the constructed Web based response on which the cache dependency is dependent; and an act of caching at least a portion of the constructed Web based response in a cache entry in the cache.

2. The method as recited in claim 1, wherein the act of selecting a data table that is to be monitored for content changes comprises an act of receiving user-input that causes the computer system to select a data table is to be monitored for content changes.

3. The method as recited in claim 1, wherein the act of selecting a data table that is to be monitored for content changes comprises an act of the computer system automatically selecting a data table in response to a received Web request.

4. The method as recited in claim 1, wherein the act of inserting a record for the selected data table into a change notification table compromises an act of inserting the record in response to user-input.

5. The method as recited in claim 1, wherein the act of inserting a record for the selected data table into a change notification table compromises an act of the computer system automatically inserting the record in response to a Web request.

6. The method as recited in claim 1, wherein the act of inserting a record for the selected data table into a change notification table compromises an act of inserting the record into a SQL table.

7. The method as recited in claim 1, wherein the act of assigning a trigger to the selected data table comprises an act of receiving user input instructing a trigger to be assigned to the selected data table.

8. The method as recited in claim 1, wherein the act of assigning a trigger to the selected data table comprises an act of the computer system automatically assigning a trigger in response to receiving a Web request for content contained in the selected data table.

9. The method as recited in claim 1, wherein the act of assigning a trigger to the selected data table comprises an act of the assigning a trigger that, when executed by a processing unit at the computer system in response to content in the selected data table being altered, will update a corresponding change ID in the table change notification table.

10. The method as recited in claim 1, wherein the act of receiving current versioning information identifying and corresponding to the selected data table comprises an act of receiving updated versioning information that indicates the cache entry is to be invalidated.

11. A computer program product executed at a computer system that access a database having one or more data tables, the computer system configured to provide content from the database to a Web server for inclusion in Web based responses to requests for Web based content, the computer system including a cache configured to cache database content included in Web based responses so as to provide more efficient access to the cached database content when formulating subsequent Web based responses, the computer program product implementing a method for formulating and caching a Web based response in response to receiving a Web based request for database content, the computer program product comprising one or more computer-readable storage media having stored thereon computer executable instructions that, when executed by a processing unit, implement the method including the following:

determine whether a cache entry for Web based content requested by a request for Web based content already exists in the cache; and upon determining that the cache entry does not exist, perform the following:

select a data table that is to be monitored for data changes, the selected data table selected from among the one or more data tables of the database;

insert a record for the selected data table into a change notification table, the record including versioning information identifying and corresponding to the selected data table, the versioning information retrievable by the Web server to determine when a corresponding cache entry containing cacheable content from the selected data table is invalid;

assign a trigger to the selected data table, the trigger configured to update the versioning information for the selected table in the change notification table when data in the selected data table is altered;

cache interim results that can be used in the generation of a plurality of different Web based responses in a cache entry in the cache, the interim results based on one or more records from the selected data, the cache entry made dependent on the selected data table by including the versioning information identifying and corresponding to the selected data table in the cache entry;

receive a Web based request for a Web based response that is to include the interim results subsequent to caching the interim results in the cache entry, the web based request corresponding to a page file which includes one or more scripts to be executed to determine the Web based response;

query the change notification table for versioning information identifying and corresponding to the selected data table;

receive current versioning information identifying and corresponding to the selected data table, compare the cached versioning information to the current versioning information;

determine how to access the interim results for inclusion in a Web based response based on the results of comparing the versioning information in response to receiving the Web based request for the portion of content by determining that the interim results are to be reconstructed from the one or more records in the selected data table and one or more records in one or more other data tables;

access the interim results in accordance with the determination by reconstructing the interim results from one or more records in the selected data table and the one or more records in the one or more other data tables not withstanding that interim results were cached at the computer system when the Web based request was received;

execute commands included in the one or more scripts in the page file to construct a Web based response responsive to the Web based request based on the interim results; and based on the commands executed during the construction of the Web response:

assign a database cache dependency to at least a portion of the constructed Web based response, the executed commands defining at least one database and at least one table on which the database cache entry is dependent, and further defining the portion of the constructed Web based response on which the cache dependency is dependent; and cache at least a portion of the constructed Web based response in a cache entry in the cache.

12. The computer program product as recited in claim 11, wherein the one or more computer-readable storage media are physical media.

13. The computer program product as recited in claim 11, wherein the one or more computer-readable storage media include system memory.

14. The method as recited in claim 1, further comprising:

an act of invalidating the cache entry that includes the interim results based on the comparison of version information in response to receiving the Web based request for the portion of content.

15. The method as recited in claim 1, wherein the act of determining how to access the interim results comprises an act of determining that the interim results are to be retrieved from the cache entry.

16. The method as recited in claim 1, wherein the act of constructing a Web based response responsive to the Web based request based on the interim results comprises including the reconstructed interim results in the Web based response not withstanding that the interim results were cached at the computer system when the Web based request was received.

17. The computer program product as recited in claim 11, further comprising:

computer executable instructions that, when executed, cause the computer system to invalidate the cache entry that includes the interim results based on the comparison of version information in response to receiving the Web based request for the portion of content.

18. The computer program product as recited in claim 11, wherein computer executable instructions that, when executed, cause the computer system to determine how to access the interim results comprise computer executable instructions that, when executed, cause the computer system to an act of determine that the interim results to be retrieved from the cache entry.

19. The computer program product as recited in claim 11, wherein computer executable instructions that, when executed, cause the computer system to construct a Web based response based on the interim results comprise computer executable instructions that, when executed, cause the computer system to include a portion of content from the selected database table in the Web based response not withstanding that the interim results were cached at the computer system when the Web based request was received.

20. In a computer system that accesses a database having one or more data tables, the computer system configured to provide content from the database to a Web server for inclusion in Web based responses to requests for Web based content, the computer system including a cache configured to cache database content included in Web based responses so as to provide more efficient access to the cached database content when formulating subsequent Web based responses, a method for updating a database dependent cache entry and invalidating a key dependent cache entry that has a key dependency the database dependent cache entry when changes are detected in a data table, the method comprising the following:
    an act of selecting a data table that is to be monitored for content changes, the selected data table selected from among the one or more data tables of the database;
    an act of inserting a record for the selected data table into a separate change notification table, the record including versioning information identifying and corresponding to the selected data table, the versioning information retrievable by the Web server to determine when a corresponding cache entry containing cacheable content from the selected data table is invalid;
    an act of attaching a trigger to the selected data table, the trigger configured to update the versioning information for the selected table in the change notification table when any record in the selected data table is altered regardless of the mechanism used to alter the record;
    an act of constructing first interim results from a collection of records, including a plurality of records in the selected data table and one or more records from one or more other data tables, the first interim results usable in the generation of a plurality of different Web based responses;
    an act of constructing second interim results from a collection of records, including a plurality of records in the selected data table and one or more records from one or more other data tables, the second interim results usable in the generation of a plurality of different Web based responses and dependent on the first interim results;
    an act of caching the first interim results in a database dependent cache entry in the cache, the database dependent cache entry including the versioning information identifying and corresponding to the selected data table;
    an act of caching the second interim results in a key dependent cache entry in the cache, the key dependent cache entry including a key dependency to the database dependent cache entry, the key dependency indicating that the key dependent cache entry should be invalidated by the database dependent cache entry when a change to a record in the selected data table is detected;
    an act of a cache interface module issuing a blocking querying to the change notification table for versioning information identifying and corresponding to the selected data table, the blocking query waiting until versioning information for the selected table is updated before returning the versioning information for the selected data table;
    an act of detecting a change to a record in the selected data table, subsequent to issuing the blocking query;
    an act of the assigned trigger updating the versioning information for the selected table in the change notification table, subsequent to issuing the blocking query;
    an act of the cache interface module receiving the updated versioning information in response to the blocking query;
    an act of comparing the cached versioning information in the database dependent cache entry to the updated versioning information; and
    based on the results of the comparison:
        an act of the database dependent cache entry invalidating the key dependent cache entry for the second interim results; and
        an act of updating the cached versioning information in the database dependent cache entry for the first interim results with the updated versioning information.

21. The method as recited in claim 1, wherein a plurality of cache entries in the cache are made dependent on a single selected data table by including the versioning information identifying and corresponding to the selected data table each of the plurality of cache entries.

22. The method as recited in claim 1, wherein a record in the separate change notification table is removed.

23. The method as recited in claim 22 wherein when a record in the separate change notification table corresponding to a selected data table is removed, a plurality of cache entries that have been made dependent on the selected data table referenced by the record are also removed.

* * * * *

UNITED STATES PATENT AND TRADEMARK OFFICE
CERTIFICATE OF CORRECTION

PATENT NO. : 7,624,126 B2  Page 1 of 1
APPLICATION NO. : 10/603532
DATED : November 24, 2009
INVENTOR(S) : Michael Joseph Pizzo et al.

It is certified that error appears in the above-identified patent and that said Letters Patent is hereby corrected as shown below:

In column 10, line 35, after "module" insert -- 136 --.

Signed and Sealed this
Tenth Day of May, 2011

David J. Kappos
*Director of the United States Patent and Trademark Office*